(No Model.) 3 Sheets—Sheet 1.
H. B. COX & J. W. GORDON.
TYPE WRITING MACHINE.
No. 469,188. Patented Feb. 16, 1892.
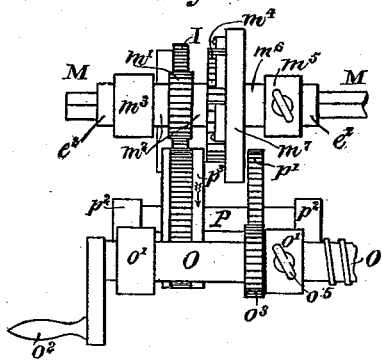
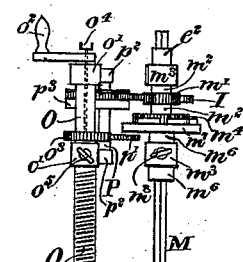
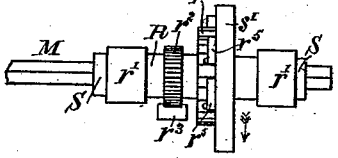
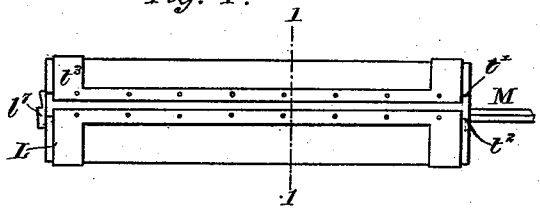
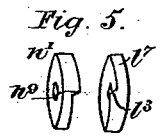
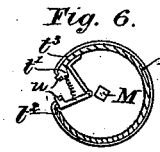
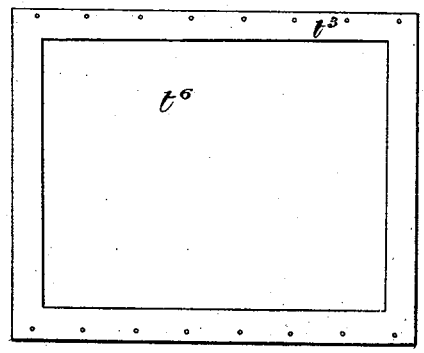

(No Model.)     H. B. COX & J. W. GORDON.    3 Sheets—Sheet 2.
TYPE WRITING MACHINE.
No. 469,188.                Patented Feb. 16, 1892.
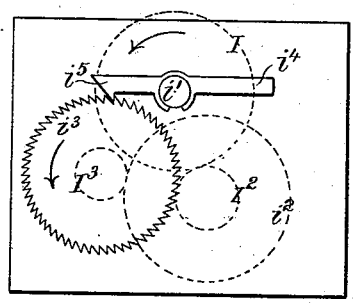
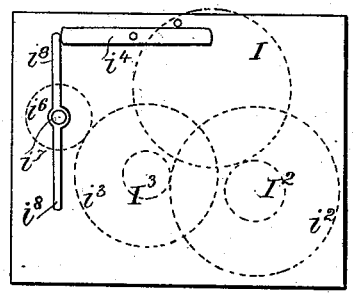
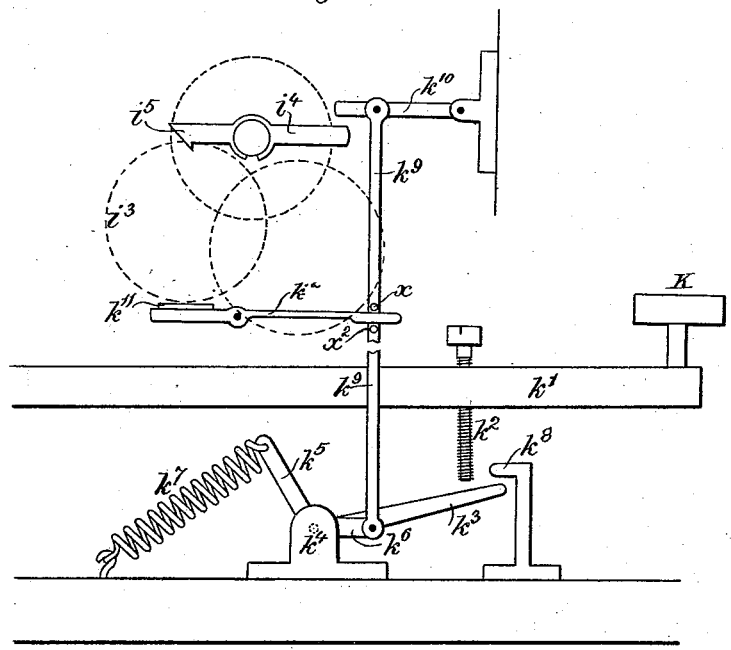

(No Model.) 3 Sheets—Sheet 3.
H. B. COX & J. W. GORDON.
TYPE WRITING MACHINE.

No. 469,188. Patented Feb. 16, 1892.

Witnesses
E. A. Dick
W. H. Shipley.

Inventors
H. B. Cox
J. W. Gordon
by L. W. Bailey Atty.

UNITED STATES PATENT OFFICE.

HUGH BERTRAM COX AND JOHN W. GORDON, OF LONDON, ENGLAND.

TYPE-WRITING MACHINE.

SPECIFICATION forming part of Letters Patent No. 469,188, dated February 16, 1892.

Application filed June 23, 1890. Serial No. 356,351. (No model.) Patented in England April 8, 1889, No. 5,948, and April 2, 1890, No. 5,126.

*To all whom it may concern:*

Be it known that we, HUGH BERTRAM COX, barrister-at-law, residing at 15 Barton Street, in the city of Westminster, and JOHN WILLIAM GORDON, barrister-at-law, residing at 2 Queen's Down Road, Lower Clapton, in the county of Middlesex, England, subjects of the Queen of Great Britain and Ireland, have invented certain Improvements in Type-Writing Machines, (for which we have obtained patents in Great Britain, No. 5,948, dated April 8, 1889, and No. 5,126, dated April 2, 1890,) of which the following is a specification.

Our said invention consists of a new and improved form of paper-carriage to be used in type-writers, which said carriage is specially designed after the printing of a letter to move the paper which it carries the exact distance needed to space the sign or combination of signs which has been printed and at the end of a line to turn the said paper automatically to the commencement of the next line, suitable means being also provided whereby the operator can move the paper to any desired position independently of the said automatic mechanism. To secure this result we mount the paper or material upon which the writing is to be done upon a cylinder by wrapping it around the surface of the said cylinder and holding it in place by any suitable means, such as those hereinafter described. After each stroke of the printing mechanism the said cylinder is rotated upon its axis through a small angle, the distance through which it rotates being adjusted and controlled by mechanism hereinafter described and shown, so as accurately to space according to the various widths of different letters or signs or combinations of letters or signs. When the end of the line is reached, the said cylinder makes a rotary movement to an extent in accordance with the distance from the end of one line to the commencement of the next circumferentially, and also a movement in the direction of its axis relatively to the striking-point to an extent in accordance with the distance between the lines of the written matter.

Figure 11:
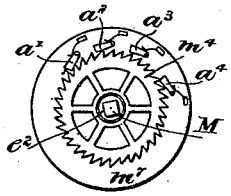
Figure 12:
Figure 13:
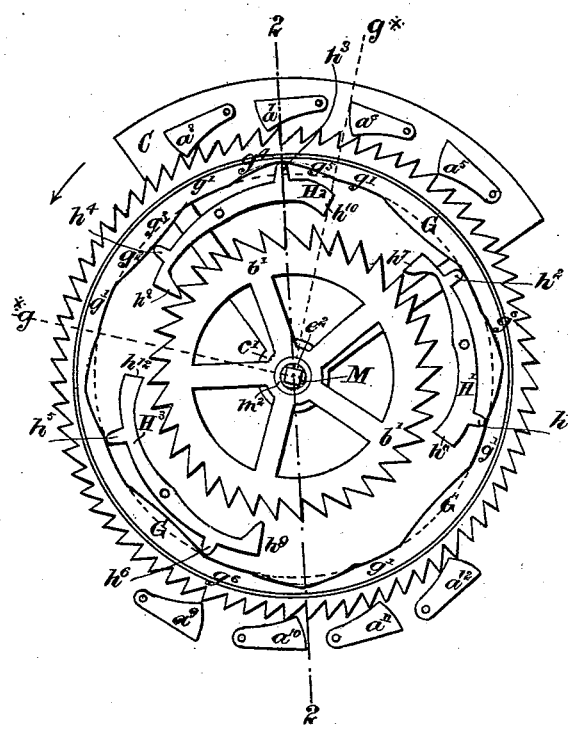
Figure 14:
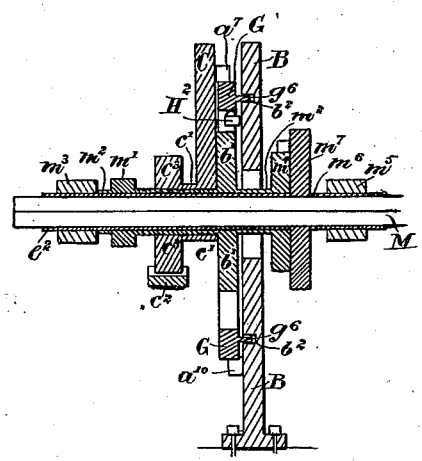

In the accompanying drawings, Figure 1 is a general view of the paper-carriage. Figs. 2 and 3 show (drawn to a larger scale) details or parts of the driving mechanism shown in Fig. 1. Fig. 4 shows the cylinder with its cover for holding the paper or material to be written on. Fig. 5 shows details (also drawn to a larger scale) of part of the cylinder-fittings. Fig. 6 is a sectional view of the cylinder, the section being taken through the line 1 1 of Fig. 4. Fig. 7 shows the cover of the cylinder or paper-holder unwrapped. Fig. 8 shows one form of our improved spacing mechanism. Fig. 9 shows a modified form of the same. Fig. 10 shows the connection between the spacer and one of the operating-keys. Fig. 11 shows a detail of mechanism whereby the paper-carrier can be moved forward to any desired position. Fig. 12 is a diagram of the special form of pawls shown in Fig. 11. Fig. 13 shows (drawn to a larger scale) an alternative form of part of the mechanism shown in Fig. 2. Fig. 14 shows (drawn to the same scale as Fig. 2) a section of Fig. 13 through the line 2 2.

Referring to Fig. 1, the cylinder L is fitted onto a square bar or spindle M, along which it is free to move. N is a traveling carriage (hereinafter called the "carriage") in and by means of which the cylinder L is caused to travel in a longitudinal direction on its axis relatively to the striking-point. O is a screwed shaft used for actuating the carriage N, as hereinafter described. The means whereby rotation is given to the bar or spindle M, and through it to the cylinder L, is as follows: Fixed in bearings $o'$ $o'$ upon the frame of the type-writer is the aforesaid screwed shaft O. This shaft can be rotated by means of the handle $o^2$. Upon the shaft O is a pinion $o^3$, which gears with a toothed wheel $p'$ upon a counter-shaft P, (see Fig. 2,) mounted in bearings $p^2$ $p^2$, secured to the frame of the type-writer. Upon the counter-shaft P is placed a barrel $p^3$, containing a spring which (by means of the rotation of the shaft O, pinion $o^3$, and wheel $p'$) is coiled within the barrel. The barrel $p^3$ is provided with spur-teeth, which gear with a wheel I, fixed upon a counter-shaft $i'$. (See Fig. 8.) The wheel I is the first of the spacing-train of gearing. With the wheel I gears a pinion $m'$, fast upon a tube or sleeve $m^2$, mounted in a bearing $m^3$, fixed to the frame of the type-writer. The wheels comprising the spacing-train are regulated as to size, so that the angular or surface motion of the pinion $m'$ is equal to that of the pinion $o^3$. The tube or sleeve $m^2$ is loosely fitted upon another tube or sleeve $e^2$, which is cylindrical outwardly, while inwardly it is squared to receive the bar or spindle M, which passes through it. Upon the end of the tube $m^2$ is fixed a ratchet-wheel $m^4$. Working in bearings $m^5$ is another tube or sleeve $m^6$, squared internally to fit the bar or spindle M, and consequently whatever motion is given to the tube $m^6$ will be transmitted to the said bar M. Upon the end of the tube $m^6$, which is nearest to the pinion $m'$, is a disk $m^7$, which carries upon that side which is nearest to the ratchet-wheel $m^4$ a specially-arranged series of pawls, (hereinafter more particularly described with reference to Fig. 11,) which are so arranged as to be successively acted upon by the teeth of the said ratchet-wheel, so that the disk $m^7$ on the tube $m^6$ and the bar M are through the said pawls driven round by the ratchet-wheel $m^4$ when that wheel is rotated. The action of these parts is as follows: On rotating the screw, shaft, or rod O, by means of the handle $o^2$, the pinion $o^3$, fast thereon, will transmit motion through the wheel $p'$ to the spindle P, so as to coil the spring in the barrel $p^3$, which spring, when wound, is prevented from recoiling by tightening up a thumb-screw $o^5$ in the bearing $o'$, so as to prevent rotation of the screwed rod O. The barrel $p^3$ will then, when required, revolve under the action of the spring in the direction shown by the arrow in Fig. 2 and give rotation in the same direction through the wheel I to the pinion $m'$, the ratchet-wheel $m^4$, the disk $m^7$, the bar M, and cylinder L, carrying the paper or material to be written upon. The rotation so given is controlled in such a manner by the following arrangement of parts, which we term the "spacer," as to allow precisely so much rotation as will suffice to accurately space the sign or combination of signs printed.

In Fig. 8 is shown in front view the wheel I, described with reference to Figs. 1 and 2, as connecting the barrel $p^3$ with the pinion $m'$. This wheel is mounted upon an arbor $i'$ and by means of a pinion $I^2$ drives the wheel $i^2$, and therefore it will be seen that the wheel I has three separate connections—namely, with the barrel $p^3$, pinion $m'$ for the purpose of causing the rotation of the cylinder L, and the wheel $i^2$ for the purpose of controlling such rotation—in order to secure accurate spacing for each sign or combination of signs printed. The wheel $i^2$, by means of another pinion $I^3$, drives the wheel $i^3$, which last wheel in this case is shown as the escape-wheel, though any other convenient train of gearing may be used. The escape-wheel $i^3$ and the wheel I travel in the direction shown by the arrows in Fig. 8. Upon the arbor $i'$ of the wheel I is placed, as shown, an arm $i^4$, which is not fixed rigidly upon the said arbor, but grips it by means of a friction-clutch, as shown, in such a manner that when the arbor rotates the arm $i^4$ is carried round with it, while nevertheless the arm can be independently moved round the arbor $i'$. The arm $i^4$ carries at one end a pallet $i^5$, suitably shaped to catch and hold the escape-wheel $i^3$. When the said pallet $i^5$ is so engaged with the wheel, the wheel $i^3$ and the rest of the train are prevented from rotating. If, however, the arm $i^4$ be lifted so as to disengage the pallet $i^5$ from the wheel $i^3$, the train will be free to travel until the arm $i^4$ (which by means of the friction-clutch will be carried round with the arbor $i'$) is permitted or caused to descend and the pallet $i^5$ to re-engage with the said wheel and so arrest the further motion of the train of wheels. It is obvious that the time during which the train of wheels is permitted to move and the angular distance through which the wheel I will rotate depends on the distance to which the pallet $i^5$ on the arm $i^4$ is raised relatively to the escape-wheel $i^3$ and the consequent time for it to descend and re-engage the escape-wheel. It is also clear that by raising the pallet $i^5$ to varying distances from the escape-wheel $i^3$ a corresponding variable extent of rotation of the wheel I can be secured. The action of these parts is as follows: When a key upon the key-board is depressed, mechanism such as hereinafter described causes the pallet $i^5$ to be lifted to such a height that before it descends, so as to re-engage with the escape-wheel $i^3$, the paper-carriage (the travel of which is controlled by the wheel I) will have moved forward the exact distance which is required to space the sign or signs which the said key prints. If the raising of the arm $i^4$ and the pallet $i^5$ is synchronous with the printing of the letter, the escape-wheel $i^3$ may be prevented from rotating, as hereinafter described, or by other convenient means, until the printing operation is completed, after which the escape-wheel $i^3$ is released and the train of wheels allowed to travel and the paper-carriage accordingly permitted to move on until the train is brought to rest by the re-engagement of the pallet $i^5$ with the escape-wheel $i^3$. Instead of mounting the arm $i^4$ on the axis $i'$, it may be mounted on an independent pivot. The distance which the train will run when released by the withdrawal of the pallet $i^5$ will depend upon the time which is allowed to elapse before the return of the pallet to its position of engagement. This may be regulated in any convenient way. For instance, it may be left to the control of the operator or to the automatic action of gravity, and for some purposes it may be desirable to allow the train of gearing to run through a relatively long period. In order to provide for this, the arrangement shown in Fig. 9 may be employed. A pinion $i^6$ is added to the train of gearing hereinbefore described, the said pinion being mounted upon an arbor $i^7$, which carries radial arms $i^8$. These arms may be flattened to serve the purpose of a flier for preventing the mischievous effects of excessive speed, and the train may be brought to rest by the abutting of one of the arms $i^3$ upon the end of the arm $i^4$, as shown. Fig. 10 shows the arrangement by which the depression of a key is caused to actuate and control the spacing mechanism. K represents one of the keys placed at the end of an ordinary key-lever $k'$. Through this lever passes an adjustable screw $k^2$, the end of which when the key is depressed impinges upon a lever $k^3$, fast on a shaft or spindle mounted in bearings $k^4$ and carrying arms $k^5$ $k^6$. The arm $k^5$, under the action of a spring $k^7$, serves to maintain the end of the lever $k^3$ (which may be made to extend along the whole length of the key-board, so as to be actuated by any key that may be struck) elevated against the under side of an abutment $k^8$, the upper side of which abutment may, if desired, form a stop for arresting the descent of the lever $k'$. Upon the depression of the key K the lever $k^3$ and arm $k^6$ will be also depressed to an extent determined by the position to which the end of the screw $k^2$ is adjusted, and thus, through the link or connecting-rod $k^9$, cause a lever $k^{10}$ to strike the arm $i^4$, so as to raise the detent $i^5$ the required distance. In order to prevent the premature movement of the train of gearing the link $k^9$ in its descent raises, by means of a pin or projection $x$ thereon, a pad $k^{11}$ on a brake-lever $k^{12}$ into contact with the escape-wheel $i^3$, so as to hold it stationary during the depression of the lever $k^{10}$, the brake-lever $k^{12}$ being elastic, so as to yield to the pressure of the link $k^9$. Upon the release of the key K the lever $k^{10}$ under the action of the spring $k^7$ is lifted by the link $k^9$ out of the way of the arm $i^4$, and by the same motion the pad $k^{11}$ is withdrawn by a pin or projection $x^2$ from the escape-wheel $i^3$ and the train allowed to travel through the required distance. It will therefore be seen that the arm $i^4$ and the pad $k^{11}$ constitute the two arms or pallets of an escapement for the purpose of controlling the escape-wheel $i^3$ and allowing it the required motion.

So far we have shown and described the method by which the rotation of the paper-carriage is automatically controlled for the purpose of spacing; but it is also necessary to provide means to enable the operator to rotate the said cylinder independently of such spacing mechanism. For this purpose there is mounted in a bearing $r'$ at the opposite end of the bar M to that on which the spacing mechanism is carried a tube R, as shown in Fig. 3, which tube is fixed loosely upon a collar S, squared internally to fit the bar M. Upon the tube R is fixed a pinion $r^2$ in gear with a rack $r^3$, by means of which motion of rotation can be given to the tube R and to a ratchet-wheel $r^4$, fixed to one end of the said tube. Fixed to the collar S is a disk $s'$, carrying a specially-arranged series of pawls $r^5$, similar to the series of pawls $a'$ to $a^4$ on the disk $m^7$, hereinbefore referred to and shown in Figs. 2 and 11. The pawls $r^5$ are arranged to gear with the ratchet-wheel $r^4$ in such a manner that when the wheel $r^4$ is rotated in the direction shown by the arrow the said pawls are acted upon by the teeth of the said wheel, and rotation is thereby given to the disk $s'$ and through the collar S to the bar M. The action of these parts is as follows: The rack $r^3$ is provided with a handle under the control of the operator, who is thereby enabled through the pinion $r^2$, the ratchet-wheel $r^4$, and bar M to rotate the cylinder L independently of the automatic spacing mechanism, which is prevented from acting by means of the arm $i^4$ and detent $i^5$ holding the wheel I. When the cylinder is operated by hand, as described, the pawls $a'$ to $a^4$ upon the disk $m^7$ slip over the teeth of the ratchet-wheel $m^4$, and in like manner when the automatic spacing mechanism operates the pawls $r^5$ upon the disk $s'$ slip over the teeth of the ratchet-wheel $r^4$.

The automatic spacing mechanism designed as hereinbefore described and shown will effect the spacing accurately of every sign or combination of signs, the size of which may vary considerably. It is obvious, however, that when the driving forward takes place either by hand or automatically the absolute stopping of the paper-carriage at a given point could not be relied upon by the use of an ordinary ratchet-wheel and pawls, as they could not be made so minute as to provide an indefinite number of stopping places. It is necessary, therefore, to make the ratchet-teeth of the ordinary size mechanically equivalent to ratchet-teeth indefinitely small. For this purpose a series of pawls is arranged so as to act successively upon the ratchet-wheel at each rotary movement of the paper-carrier through an angle equal to the space between two teeth of the wheel divided by the number of pawls employed in the series.

Fig. 11 shows in front elevation the ratchet-wheel $m^4$ and disk $m^7$, the same figure serving also to illustrate the ratchet-wheel $r^4$ and disk $s'$. On the disk $m^7$ a series of pawls $a'$ $a^2$ $a^3$ $a^4$ is arranged to act in succession upon the wheel $m^4$. The arrangement of these pawls in series is such that when the pawl $a^4$, for example, has just slipped over the point of a tooth and is in a position ready to be driven forward, on the wheel $m^4$ being moved, the pawl $a^3$ will be occupying a position intermediate between two teeth and behind the foremost of them at a distance of about one-fourth of the space between two teeth, at the same time the pawl $a^2$ will occupy an intermediate position midway between two other teeth, while the pawl $a'$ will occupy a position between two other teeth, and behind the foremost of them at about three-fourths of the distance which separates them. These pawls are formed with inclined or sloping faces, so as to allow the wheel $m^4$ to turn while in contact with any one of the pawls through an angle not less than one-fourth of the angle between the points of two successive teeth. The object of forming the pawls with inclined acting faces is to enable the wheel $m^4$ to stop at an indefinite number of stopping places intermediate between those furnished by the serial arrangement of the pawls themselves. The inclined faces of the pawls acting in succession maintain a continuous contact between the pawls and the teeth of the wheel $m^4$. For example, the face of the pawl $a^4$ is shown engaged and will not escape from contact with the tooth until the face of the pawl $a^3$ has come into position to engage a tooth. By means of a series of pawls constructed and arranged as described, so slight an inclination relatively to the tooth may be given to the faces of the pawls that the hold which the wheel takes of them is perfectly sure, and there is no danger of their being driven out of engagement by the pressure of the tooth upon them. The form of the acting faces of these pawls may be determined by taking a center slightly above the center of rotation of the pawl, as shown at $y$, Fig. 12, and describing an arc 1 2 from that center joining the uppermost and lowermost points of the face of the pawl required. The pawls are furnished with springs for holding them in contact with the wheel $m^4$. Should it be desired to dispense with the train of wheels and friction-arm, which we term the "spacer," the arrangement of mechanism illustrated in Figs. 13 and 14 may be employed, and which embraces the principle involved in the aforesaid combination of a ratchet-wheel with a series of pawls; but in this arrangement the wheel I is only employed for the purpose of connecting the barrel $p^3$ with the pinion $m'$. According to this modification upon the tube $m^2$, carrying the pinion $m'$, there is fixed an escape-wheel $b'$, and on this tube there is loosely mounted between this escape-wheel and the pinion $m'$ a short tube $c'$, on which is fixed a spur-wheel $c^3$ and a sector C. The sector C carries a series of driving-pawls $a^5 a^6 a^7 a^8$ with sloped faces for the purpose of giving an indefinite number of stopping places (in the manner hereinbefore described) to a cam-ring G, carried by a plate B, fixed to the frame of the type-writer and provided with an opening through which the bar M and tube $m^2$ pass.

A series of escapements H' $H^2$ $H^3$ are mounted on the plate B or other stationary part of the type-writer, the pallets of which escapements engage in succession the teeth of the escape-wheel $b'$, the said escapements being actuated by the cam-ring G, which is supported by a circular flange $g^6$, engaging a groove $b^2$ in the face of the plate B, as shown in Fig. 14. The cam-ring G has ratchet-teeth upon its outer edge, with which teeth the driving-pawls $a^5 a^6 a^7 a^8$ on the sector C engage to rotate the said cam-ring, detents $a^9 a^{10} a^{11} a^{12}$ being pivoted to the plate B to engage the teeth and prevent recoil or backlash of the wheel. The escapements H' $H^2$ $H^3$ have each two bearing studs or projections $h' h^2 h^3 h^4 h^5 h^6$, which bear on the interior cam-surface of the ring G, which surface is so shaped that when the ring is rotated the pressure of the cam-surface upon the bearing-studs will cause the pallets of the escapements H' $H^2$ $H^3$ to engage successively with the teeth of the escape-wheel $b'$. The contour of the cam-surface of the ring G to effect the engagement of the pallets of escapements at the required periods is determined in the following manner: A circle is first drawn in which the points of all the studs $h' h^2 h^3 h^4 h^5 h^6$ will lie if the escapements H' $H^2$ $H^3$ are so disposed that their studs are all equidistant from a common center. This circle is then divided into quadrants, and each quadrant is subdivided into six approximately equal parts. Referring to one of these quadrants, which is shown between the dotted lines $g^\times g^\times$ as an example, the first subdivision $g'$ is a segment, being one twenty-fourth part of the original circle. The second subdivision $g^2$, which lies next adjacent to the subdivision $g'$ and above it, projects inward toward the center of the circle to such a distance as will hereinafter be defined. The third subdivision $g^3$ brings back the curve to the original circle $g'$, in which circle the fourth subdivision $g'^\times$ wholly lies. The fifth subdivision $g^4$ projects outward from the circle to a point, which will also be hereinafter defined. The sixth subdivision $g^5$ brings back the figure to the circle $g'$ at the starting-point of the next quadrant, in which this whole preceding figure is repeated. It is the last subdivision $g^5$, which is the important part of the curve, upon which the form of the whole mainly depends. Its operation will be easily understood by supposing the cam-ring G to be moved through an angle of about fifteen degrees in the direction shown by the arrow. The stud $h^3$ would then be pressed down from the position shown in the drawings to the level of the circle $g'$. The depression of this stud will cause the pallet $h^8$ to move out of engagement with the escapement-wheel $b'$, and the two studs $h^3 h^4$ having both then reached the circle $g'$, the further revolution of the cam-ring G through a similar angle will cause no additional movement of the escapement $H^2$; but both its pallets will stand clear of the escape-wheel $b'$ in the position occupied in the drawings by the escapements H' and $H^3$. It is assumed that in the present instance it is desired that the motion of the escape-wheel $b'$, across the face of the pallet $h^8$, shall be sensibly uniform, and therefore the curve $g^5$ is drawn of such a shape as to produce this result. An approximation to this shape, sufficiently close to serve the present purpose, may be obtained by joining the two points which the segment $g^5$ has in common with the segments $g^4$ and $g'$, respectively, by means of the arc of a circle having the same radius as the segment $g'$. Should any other than uniform motion of the escape-wheel be desired, the curve must be modified accordingly. The highest point of the curve $g^5$ must be at such a level as will allow the pallet $h^8$ to engage at its full working depth with the escape-wheel $b'$. Similarly the lowest point of the curve $g^2$ must be placed at such a level that by its action on the stud $h^4$ it will drive the pallet $h^8$ into this position. The curves $g'$ have been already defined. Their action upon the studs is merely to hold the escapement out of contact with the escape-wheel. The contour of $g^2$, $g^3$, and $g^4$ need not be particularly described. They only fulfill the condition of permitting the cam-ring G to glide over the studs $h^3$ and $h^4$ of the escapements with the least possible friction, since the movement of the escape-wheel is in no way affected by the motion which they give to the escapement. The point at which the subdivisions $g^2$ and $g^3$ meet must project inward from the circle $g'$ to such a distance that the passage of one stud $h^4$ over this point forces the opposite stud $h^3$ into the lowest point of the recess formed by the subdivisions $g^4$ and $g^5$. Each of the remaining quadrants having been planned out in the manner above described, the interior of the entire ring G is cut to the shape thus delineated. The three escapements $H'$ $H^2$ $H^3$ are arranged within the cam-ring G in such a manner that the rotation of the cam-ring causes them to act one after the other upon the escape-wheel, as follows: In the position shown in Fig. 13 the pallet $h^7$ has just cleared the escape-wheel. The pallet $h^8$ is engaged at its full working depth and is just about to commence its rise as the cam-ring rotates. The pallet $h^9$ is standing clear, but will by the same rotation of the cam-ring be forced into a position of engagement. The continued rotation of the cam-ring will cause the pallet $h^9$ to move out of engagement and the pallet $h^{10}$ to move into engagement, and if rotation be further continued the pallets $h^{11}$ and $h^{12}$ will in their turn be caused to operate in the same way. Thus the turning of the cam-ring through an angle of ninety degrees will cause all six pallets to act in succession upon the escape-wheel. The distances of these pallets from the pivots of their respective escapements are so varied as to form in themselves a series analogous to the series of pawls hereinbefore described, and operate like them to subdivide the tooth-angle, which in this case is subdivided into six parts. The acting faces of the pallets should be shaped in the manner already described with reference to Fig. 12, so as to subtend this subdivided angle and produce a gliding motion of the escape-wheel. It will be seen that whenever the cam-ring G is moved through any angle the escapement-wheel $b'$ will move through a corresponding angle. In the arrangement described and illustrated in Fig. 13 the angular motion of the escape-wheel will be one-ninth of the angular motion of the cam-ring. It will however be understood that we do not confine ourselves to these proportions, as the number of escapements used and the number of times that the cam-figure is repeated on the cam-ring G may be indefinitely varied. If the sector C is driven backward—that is, in a direction contrary to that indicated by the arrow in Fig. 13—the driving-pawls $a^5$ $a^6$ $a^7$ $a^8$ will slip over the ratchet-teeth on the exterior of the cam-ring G, springs (not shown in the drawings) being provided to both the driving-pawls $a^5$ $a^8$ and the detents $a^9$ $a^{12}$ to force them into engagement with the teeth of the wheel. During the backward motion of the sector C and pawls $a^5$ $a^8$ the cam-ring G is prevented from recoil by the detents $a^9$ $a^{12}$, carried on the plate B, and consequently the escapements $H'$ $H^2$ $H^3$ hold the escape-wheel $b'$. When, however, the sector C is turned in the direction of the arrow, the driving-pawls $a^5$ $a^8$ engage the teeth on the cam-ring so as to rotate it, the escapements $H'$ $H^2$ $H^3$ then permitting of the revolution of the escape-wheel $b'$ through any required angle. The escape-wheel $b'$ being fixed upon the tube $m^2$, the tube $m^2$ will rotate with it and so impart motion through a corresponding angle to the ratchet-wheel $m^4$, which is fixed to the opposite end of the tube $m^2$, and by means of the disk $m^7$ and its pawls $a'$ $a^4$, fixed on the said disk, give rotation to the tube $m^6$, and through it to the bar or spindle M, and consequently to the cylinder L and the paper mounted upon it. The extent of rotation of the cylinder L consequently corresponds to the extent of rotation allowed to the escape-wheel $b'$ and which is governed by the cam-ring G and the escapements $H'$ $H^2$ $H^3$. The number of stopping places of the said escape-wheel $b'$ is rendered indefinite and the exact amount of rotation can be given to the cylinder L to space any signs or combination of signs to be printed on the paper or material mounted on the said cylinder. To effect the exact extent of rotation by the depression of a key, the said key is (by means of the adjusting-screw $k^2$ and lever $k^3$ operating the link $k^9$) caused to drive forward a rack $c^2$, which operates the pinion $c^3$, fixed upon the tube $c'$, which carries the sector C. Consequently upon the depression of a key the sector C is driven backward (against the pressure of a spring) to the exact distance required to space the sign or combination of signs to which the key corresponds. Upon the release of the key the sector C, under the impulse of the spring referred to, at once drives forward the cam-ring G the same distance and allows a corresponding rotation to the escape-wheel $b'$ and also, by the means hereinbefore described, to the cylinder L and the paper mounted thereon. When the operator is rotating the paper-carriage by means of the rack $r^3$ and pinion $r^2$, the escapements $H'$ $H^2$ $H^3$ prevent the escape-wheel $b'$ rotating.

We will now describe means whereby when a line of writing is completed the paper-carriage is caused to automatically come into position for the commencement of the next line, and for which purpose it is necessary to give a longitudinal traverse to the carrier in the direction of its axis relative to the striking-point, so as to allow for the requisite distance between the lines of the written matter.

Upon the bar M and free to travel along it is placed the carriage N, containing the cylinder L. The carriage consists of a frame open at the sides and ends to admit of the written matter being readily seen, and may be provided with small anti-friction rollers $l'$ or other suitable guides to facilitate or direct its travel.

At the forward end of the carriage are fixed, as shown in Fig. 1, two spur-wheels $l^4$ $l^5$ in gear with each other. The wheel $l^4$ is fixed on a tube $l^2$, (or provided with an extended boss,) which is squared on the interior to fit the square spindle or bar M, so as to rotate therewith, the projecting ends of the said tube (or boss) serving to keep the wheel in proper position in the carriage. The wheel $l^5$ is in like manner mounted upon a tube $l^3$, (or provided with an extended boss,) the interior of which is screw-threaded to fit the screwed spindle or rod O. The screw O is prevented from rotation by the thumb-screw $o^3$, and it therefore follows that as the wheel $l^4$ rotates with the bar M the wheel $l^5$ will be made to travel along the screw O and will draw the carriage N along with it.

In order that the cylinder L may have a longitudinal motion to some extent independent of that of the carriage N, the carriage N is provided at its forward end with a snail or cam-surface $n'$, as shown, which engages with a corresponding snail or cam-surface $l^7$, fixed upon the forward end of the cylinder L. These snails or cam-surfaces are shown on an enlarged scale at Fig. 5. The pitch of each of these snails or cam-surfaces $n'$ $l^7$ is exactly one-half of that of the pitch of the screw O. Consequently the cylinder L in its rotation is caused to travel back relatively to the carriage N through a distance equal to that through which during the same time the carriage N has traveled forward. Thus the cylinder L maintains an invariable position relatively to the bar M during its rotation until the point of the snail or cam-surface $n'$ slips over the point of the snail or cam-surface $l^7$, which it is caused to do at the precise moment when the end of a line has been reached, whereupon under the impulse of a spring $n^2$, interposed between the rear end of the cylinder L and the carriage N, the cylinder is caused to advance to the exact distance which the carriage N has traveled. The pitch of the screw O is made equal to the distance desired between the lines of the written matter. It is necessary when passing from line to line to give the cylinder a sufficient amount of angular motion to cause the margin of the paper thereon to pass clear of the printing-point. This may be automatically effected by cutting the surfaces $n^9$ and $l^3$ of the snails $n'$ and $l^7$ at an angle, as shown in the enlarged view in Fig. 5. The snail $l^7$, which rotates with the bar M, may have a square hole, as shown, while the snail $n'$, within which the bar M rotates, may be provided with a round hole.

For the purpose of returning the cylinder and carriage to the starting-point when it is desired to commence a new page the screw O is rotated in a reverse direction by means of the handle $o^2$, thereby at the same time coiling the spring in the barrel $p^3$ by operating the gearing $o^3$ $p'$. The thumb-screw $o^5$ is released to allow the screw O to be rotated, and a thumb-screw $m^8$ in the bearing $m^5$ is tightened up to resist any tendency of the bar M and cylinder N to rotate with the screw O. If it be desired to facilitate the travel of the carriage N along the bar M, weights or springs may be connected to hooks $n^8$ or otherwise. Should the spring in the barrel $p^3$ not be run down when it is desired to return the paper-carriage L and carriage N to their starting position, this may be done (before commencing to rewind) by means of the handle $o^2$, for which purpose a grip or key $o^4$ is provided, which connects the pinion $o^3$ with the rod O, but which key may be readily removed to allow the pinion to slip upon its shaft, so that the spring in the barrel will immediately recoil or run down, and the pinion being again made fast to the shaft by inserting the clip or key $o^4$ the spring can be coiled, as hereinbefore described.

Various methods may be employed for mounting the paper upon the cylinder L. One such method is illustrated in Figs. 4, 6, and 7. The surface of the cylinder L is cut away between the lines $t'$ $t^2$ to receive the edges of a covering or frame $t^3$ of leather or other suitable material. (Shown separated from the cylinder L and opened out at Fig. 7.) The edges of this covering or frame are held by hooks or clamps $u$, suitably arranged so as not to project beyond the contour or periphery of the cylinder L. The paper, being first wrapped about the cylinder L, is held in close contact therewith by the said covering, the opening $t^6$ therein serving to expose so much of the paper as is required to be written upon.

Having now particularly described and ascertained the nature of our said invention and in what manner the same is to be performed, we declare that what we claim is—

1. In a type-writing machine, the combination of a cylinder upon which the paper may be mounted, a support for the cylinder, a motor-spring operatively connected with the said cylinder for rotating the same, escapement mechanism controlling the action of said motor-spring, and variable connections between the keys and the said escapement, whereby the said motor-spring imparts variable movements to the cylinder as the different keys are operated, substantially as set forth.

2. In a type-writing machine, the combination of the paper-supporting cylinder, the mechanism for rotating the cylinder, a spring-motor for operating such mechanism, a detent which arrests the movement of the mechanism, and variable connections between the different keys and the said detent, whereby it is moved to a greater or less extent upon the movement of the different keys, substantially as set forth.

3. In a type-writing machine, the combination of the paper-cylinder, a train of gearing adapted to rotate the same, including an escape-wheel, a detent which engages with the said wheel for arresting the movements of the said train of gearing, the said detent having a frictional engagement with one member of said train, whereby as the train of gearing moves the detent is carried toward the said escape-wheel, and a connection between the said detent and an operating-key, whereby it is moved away from the ratchet-wheel, (sliding on its support,) and a spring-motor for driving such train of gearing, substantially as set forth.

4. The combination of the cylinder L, cover or frame $t^3$ for holding in position on the cylinder the paper or other material to receive the writing, and the hooks for securing the cover on the cylinder, arranged within the periphery or contour of the cylinder, substantially as hereinbefore described.

5. In a type-writer, the combination of the paper-cylinder, the bar upon which it is mounted, by which it is rotated, and upon which it has limited longitudinal movement, a sliding carriage carrying the cylinder and movable upon the said bar, the screw O, the gear-wheels mounted, respectively, upon the said screw-shaft and the said bar, the cam-surfaces $n'$ and $l^7$, carried, respectively, by the said bar and the cylinder, and the spring $n^2$, which holds the said cam-pieces in engagement, substantially as set forth.

6. In a type-writer, the combination of the paper-cylinder, a bar M, upon which the cylinder is mounted, which operates to turn the cylinder and upon which it has a limited longitudinal movement, the stationary screw-shaft O, the gear-wheels $l^4 l^5$, mounted, respectively, upon the bar M and the screw-shaft, the cam-faces $n'$ and $l^7$, carried, respectively, by the bar M and the cylinder and having the inclined angular faces $n^9$ and $l^3$, and the spring $l^2$, which holds the said cam-faces in engagement, substantially as set forth.

7. In a type-writer, the combination of a toothed wheel with a series of pawls carried by driving mechanism and having their acting faces inclined or sloping to maintain a continuous contact between the wheel and the driving mechanism, the said pawls being arranged with reference to the wheel, so as to engage with its teeth at different points in its rotation within the limit of a single tooth-space to secure the accurate spacing of various signs or combinations of signs, substantially as described and shown.

8. In a type-writer, the combination, with a ratchet-wheel and a number of driving-pawls having inclined acting faces arranged serially about the wheel, so as to subdivide the tooth-angle, as herein described and shown, of a similar series of pawls or detents arranged to prevent backlash of the said wheel, a rack and pinion, and the sector carrying the driving-pawls by means of which the wheel is moved forward, substantially in the manner and for the purposes hereinbefore described and shown.

9. In a type-writer, the combination, with the paper-cylinder, of a toothed wheel $b'$, mounted upon the bar or supporting-shaft of said cylinder, a series of escapements H′ H² H³, arranged, as described, to subdivide the tooth-angle of the wheel $b'$, and variable mechanism engaging with and operating the said escapement, substantially as set forth.

10. In a type-writer, the combination, with the paper-cylinder, of a toothed wheel $b'$, mounted upon the shaft of the paper-cylinder, a number of escapements H′ H² H³, arranged in series around the said wheel, a cam-ring adapted to engage with the said escapements to cause them to move the escapements successively into engagement with the wheel $b'$, and mechanism for moving the cam-ring, substantially as set forth.

11. In a type-writer, the combination, with the paper-cylinder, of a toothed wheel $b'$, mounted upon the shaft of the paper-cylinder, a number of escapements H′ H² H³, arranged in series around the said wheel, a cam-ring adapted to engage with the said escapements to cause them to move the escapements successively into engagement with the wheel $b'$, variable mechanism for moving the cam-ring a greater or less distance, and stops for arresting the backward movement of the cam-ring, substantially as set forth.

12. In a type-writer, the combination, with a number of escapements H′ H² H³, arranged to operate serially upon a toothed wheel $b'$, in the manner and for the purposes herein described and shown, and a cam-ring arranged to bring the said escapements into engagement with the said wheel, of a number of driving-pawls $a^5 a^6 a^7 a^8$, so arranged on a sector C as to engage serially with teeth cut upon the outer edge of the said cam-ring, and a number of detents $a^9 a^{10} a^{11} a^{12}$, similarly arranged on a stationary part of the apparatus to prevent backlash of the said cam-ring, all substantially as herein described.

In testimony whereof we have signed our names to this specification in the presence of two subscribing witnesses.

H. BERTRAM COX.
J. W. GORDON.

Witnesses:
W. I. WEEKS,
S. CRANSA,
*Both of 9 Birchin Lane, London, E. C.*